(12) United States Patent
Dubnicki et al.

(10) Patent No.: US 8,090,792 B2
(45) Date of Patent: Jan. 3, 2012

(54) METHOD AND SYSTEM FOR A SELF MANAGING AND SCALABLE GRID STORAGE

(75) Inventors: Cezary Dubnicki, Monmouth Junction, NJ (US); Cristian Ungureanu, Princeton, NJ (US); Christian Toelg, Hightstown, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 791 days.

(21) Appl. No.: 12/038,296

(22) Filed: Feb. 27, 2008

(65) Prior Publication Data

US 2008/0221856 A1 Sep. 11, 2008

Related U.S. Application Data

(60) Provisional application No. 60/893,645, filed on Mar. 8, 2007.

(51) Int. Cl.
*G06F 15/16* (2006.01)
(52) U.S. Cl. ........ 709/217; 709/212; 709/226; 711/114; 714/1
(58) Field of Classification Search ............. 709/212, 709/226, 217; 711/114; 714/1
See application file for complete search history.

(56) References Cited

U.S. PATENT DOCUMENTS

| | | | | |
|---|---|---|---|---|
| 7,783,605 B2* | 8/2010 | Meyerson | ........... | 707/655 |
| 2005/0289110 A1* | 12/2005 | Giampaolo et al. | ........... | 707/1 |
| 2007/0088703 A1* | 4/2007 | Kasiolas et al. | ........... | 707/10 |
| 2007/0208748 A1* | 9/2007 | Li | ........... | 707/10 |
| 2009/0210631 A1* | 8/2009 | Bosworth et al. | ........... | 711/141 |

OTHER PUBLICATIONS

Nychis et al. Analysis of Erasure Coding in a Peer to Peer Backup System. Carnegie Mellon Univeristy. May 2006.*
Gray et al. Parity Striping of Disc Arrays: Low-Cost Reliable Storage with Acceptable Throughput. Jan. 1990.*

* cited by examiner

*Primary Examiner* — Ajay Bhatia
*Assistant Examiner* — Bryan Lee
(74) *Attorney, Agent, or Firm* — Joseph Kolodka (57) ABSTRACT

The present invention generally provides a method for grid storage including balancing read and write requests from applications across a first group of nodes in a grid storage system for avoiding hot spots and optimizing performance through smart caching; balancing storage capacity across a second group of nodes in the grid storage system, nodes in the first and second groups being at least one of hardware interchangeable online, capable of being added to change performance or capacity of the grid storage system and capable of being removed to change performance or capacity of the grid storage system; and self managing of the first and second groups of nodes for providing at least one of scalability, self healing after failure of components in the grid storage, non-disruptive upgrades to the grid storage system, and eliminating duplicate data on an object or sub-object level in the grid storage system.

13 Claims, 10 Drawing Sheets

|  | Prefix | Index | Version |
|---|---|---|---|
| Supernode 226 | 01101 | Cardinality = 6 | 2 |
| Component 214a | 01101 | 0 | 1 |
| Component 216c | 01101 | 1 | 1 |
| Component 218b | 01101 | 2 | 2 |
| Component 220d | 01101 | 3 | 2 |
| Component 222a | 01101 | 4 | 1 |
| Component 224a | 01101 | 5 | 1 |
| Supernode A | 01100 | Cardinality = 5 | 1 |
| ⋮ | ⋮ | ⋮ | ⋮ |

METHOD AND SYSTEM FOR A SELF MANAGING AND SCALABLE GRID STORAGE

This application is a continuation-in-part of U.S. patent application Ser. No. 12/023,133, entitled "Method and Apparatus for Storing Data in a Peer to Peer Network", filed Jan. 31, 2008, and this application also claims the benefit of U.S. Provisional Application No. 60/893,645, entitled "HYDRAStor Grid Storage Architecture Overview", filed Mar. 8, 2007, incorporated herein by reference.

BACKGROUND OF THE INVENTION

The present invention relates generally to storage and more particularly to a method and system for a self managing and scalable grid storage.

Storage environments have evolved from islands of capacity with minimal management using disparate tools to more centralized data centers consolidating the storage infrastructure in a few locations. This evolution has been achieved primarily due to reduced networking costs that allow more cost-effective remote connectivity of distant locations to a central data center.

Within these central data centers, storage area network SAN and network attached storage NAS infrastructures have grown in capacity and complexity creating new types of issues in scalability, interoperability and management. Islands of capacity remain, though less driven by location rather than by application. Primary storage, backup, archiving, replication, snapshot, and continuous data protection (CDP) all need to be managed and provisioned separately. Further complicating management matters, these applications rely on heterogeneous hardware that differs by capacity; type of media (disk, tape); data format (block, file); generation and firmware level; operating system; manufacturer, and more. Managing this complex infrastructure has become a management and interoperability nightmare. There are several approaches to deal with storage complexity: storage islands, storage management software and storage virtualization.

Storage islands, often grouped by application type and/or vendor, tried to "keep things simple" and minimize the need for cross training among those responsible for managing them. However, storage islands require manual management and provisioning of each hardware component through a separate user interface, and often create at least as many problems as they solve.

Storage management software is aimed at providing one centralized user interface to manage all storage components. However, storage remains complex and has to be managed manually by storage administrators based on the individual features of each product in the mix.

Storage virtualization is aimed at hiding the underlying complexity from the storage administrator by bundling hardware assigned to a specific application into one pool of storage and eliminating the need to manually migrate data from one disk array to another. However, other management tasks, such as the creation of virtual logical unit numbers LUNs, still require manual interaction. Storage virtualization does not eliminate the underlying complexity and therefore products in this space are struggling to provide true full interoperability. Virtualization also does not eliminate storage silos of different point applications for data protection and the need to manually manage them.

Peer to peer networks for storing data may be overlay networks that allow data to be distributively stored in the network (e.g., at nodes). In peer to peer networks, there are links between any two peers (e.g., nodes) that communicate with each other. That is, nodes in the peer to peer network may be considered as being connected by virtual or logical links, each of which corresponds to a path in the underlying network (e.g., a path of physical links). Such a structured peer to peer network employs a globally consistent protocol to ensure that any node can efficiently route a search to some peer that has desired data (e.g., a file, piece of data, packet, etc.). A common type of structured peer to peer network uses a distributed hash table (DHT) in which a variant of consistent hashing is used to assign ownership of each file or piece of data to a particular peer in a way analogous to a traditional hash table's assignment of each key to a particular array slot.

However, traditional DHTs do not readily support data redundancy and may compromise the integrity of data stored in systems using DHTs. To overcome these obstacles in existing peer to peer networks, files or pieces of data are N-way replicated, but the result is high storage overhead and often requires multiple hashing functions to locate copies of the data. Further, it is difficult to add support for monitoring data resiliency and automatic rebuilding of missing data.

Accordingly, there is a need for an improved grid storage system that is self managing and scalable.

SUMMARY OF THE INVENTION

The present invention generally provides a method for grid storage including balancing read and write requests from applications across a first group of nodes in a grid storage system for avoiding hot spots and optimizing performance through smart caching; balancing storage capacity across a second group of nodes in the grid storage system, nodes in the first and second groups being at least one of hardware interchangeable online, capable of being added to change performance or capacity of the grid storage system and capable of being removed to change performance or capacity of the grid storage system; and self managing of the first and second groups of nodes for providing at least one of scalability, self healing after failure of components in the grid storage, non-disruptive upgrades to the grid storage system, and eliminating duplicate data on an object or sub-object level in the grid storage system.

The present invention also provides for a grid storage system including a first group of nodes in a grid storage system to balance read and write requests from applications for avoiding hot spots and optimizing performance through smart caching; a second group of nodes in the grid storage system for balancing storage capacity, nodes in the first and second groups being at least one of hardware interchangeable online, capable of being added to change performance or capacity of the grid storage system and capable of being removed to change performance or capacity of the grid storage system; and a self management system for the first and second group of nodes for providing at least one of scalability of the first and second groups of nodes, self healing after failure of components in the grid storage system, non-disruptive upgrades to the grid storage system, and eliminating duplicate data on an object or sub-object level in the grid storage system.

These and other advantages of the invention will be apparent to those of ordinary skill in the art by reference to the following detailed description and the accompanying drawings.

DETAILED DESCRIPTION

The inventive grid storage system provides a resilient architecture based on the assumption that hardware failures inevitably will occur in any large-scale system. Rather than attempt to prevent these failures at high cost through various hardware hardening techniques, the inventive grid storage technique handles hardware failure by relying on a large number of standardized commodity server nodes that can be replaced easily. The inventive grid storage system protects data through the high resiliency and self-healing capacity implemented by its management process. The inventive grid storage technique manages data with low storage overhead and full automation thus ensuring low system cost as well as low operating cost.

From a storage administrator's perspective, the inventive grid storage technique's objective is to provide the simplicity needed to be able to manage petabytes of data in today's storage environments. The inventive grid storage technique does not merely hide the storage complexity arising from utilizing heterogeneous hardware, different point applications and the like, rather, it streamlines storage by providing built-in data services and data policies. Data is not only stored but also automatically protected according to its importance and legal requirements through its whole life cycle as established by the customer.

The inventive grid storage system eliminates storage silos for backup, archiving, CDP and replication, eliminates the need to manage and provision separate storage pools and eliminates the need to migrate data between different tiers.

The inventive grid storage system eliminates storage complexity through two key aspects. On the hardware side, the inventive grid storage system's use of simple commodity servers as nodes that can easily and non-disruptively added, upgraded or removed allows customer to ride the inevitable technology curve. On the software side, the inventive grid storage integrates data services such as data protection combined with self-management that reduces the need for manual interaction.

Figure 8:
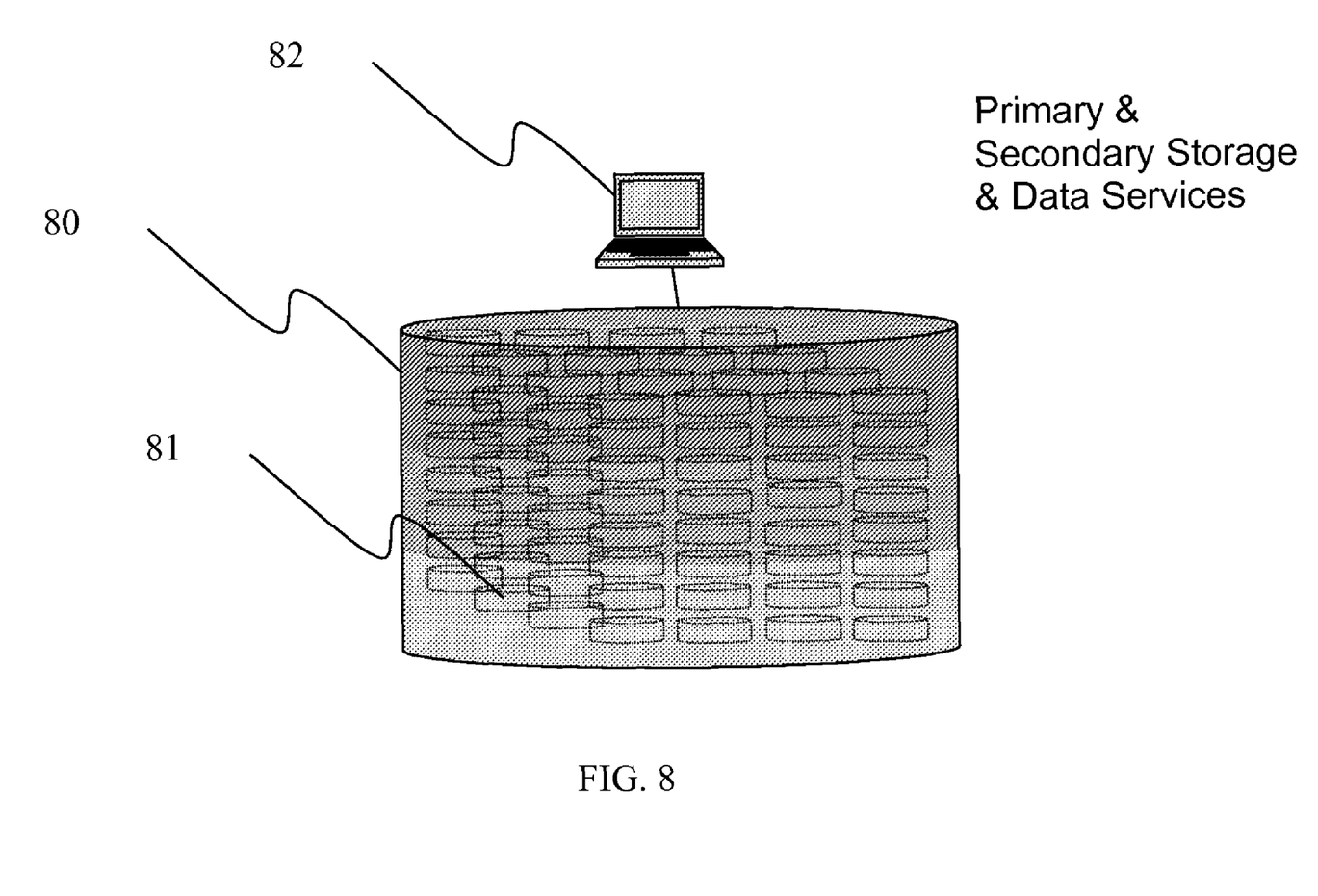
FIG. 8 is a schematic drawing of grid storage management in accordance with the invention.

Referring to the diagram of FIG. 8, the inventive grid storage system thus integrates primary and secondary storage including data services into one scalable pool of storage 80 consisting of many individual nodes 81, (referred to herein below and in the preceding figures as supernodes). The inventive grid storage system is self-managing, i.e. in that most management functions are handled automatically by the grid storage system itself to reduce operational cost so that the system as a whole can easily be monitored and managed through one central user interface 82.

First, the inventive grid storage system eliminates the clutter of different types of hardware for different purposes such as storage, backup, archiving, etc. by relying on commodity servers that serve as interchangeable nodes 81. Gone are storage silos and the need to manage and provision each silo separately. Nodes can be added or removed seamlessly to add capacity, upgrade hardware to the next generation or deal with hardware failures.

Figure 9:
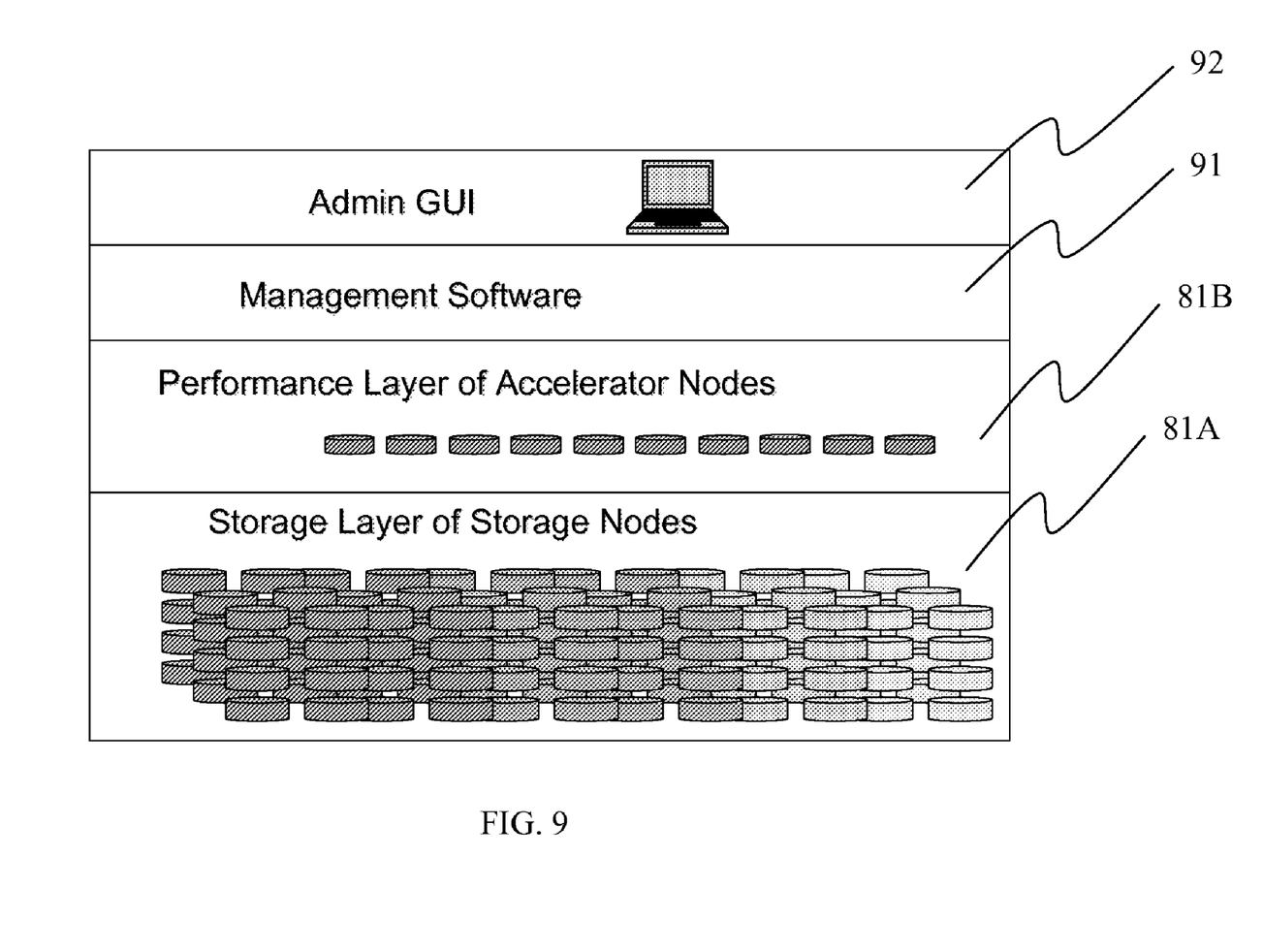
FIG. 9 is a schematic drawing of key features of the grid storage management in accordance with the invention.

Referring now to the diagram of FIG. 9, nodes in the inventive grid storage system are assigned to two principal layers, a performance layer consisting of accelerator nodes (AN) 81B and a storage layer consisting of storage nodes (SN) 81A. The storage nodes are supernodes, described below in conjunction with FIGS. 1-7. The distinction in the two types of nodes is in their functionality, which is necessary so users can scale performance and capacity independently to their needs while avoiding underutilization of capacity or performance. The two-layer architecture is what allows the inventive grid storage system to scale to petabytes of storage capacity and tens of gigabytes of performance. The performance layer balances read and write requests from applications across the accelerator nodes to avoid hotspots and it optimizes performance through smart caching and other techniques. The storage layer balances storage capacity across all storage nodes. The inventive grid storage system has no centralized databases or other components to ensure that there is no single point of failure in the system.

The inventive grid storage architecture has the following key features: 1) A true distributed grid architecture, 2) Node-based grid, 3) No single point of failure, 4) Self-Management, 5) Self-Healing and 6) Web-based management interface.

A true distributed grid architecture—The inventive grid storage system can span multiple locations and survive failure of a whole data center. Alternatively, the inventive grid storage system can be implemented in each location with data replicated between locations after duplicate data has been eliminated.

Node-based grid consisting of commodity servers. Storage nodes 81A as well as accelerator nodes 81B can be added to the inventive grid storage 80 in any location to optimize utilization and meet local requirements for performance and capacity.

No single point of failure. The inventive grid storage architecture has no single point of failure and its intelligent software 91 (i.e., management software) has no centralized components such as management databases or lookup tables.

Self-management capability. Scaling the inventive grid storage system is as easy as plug and play, as additions to the system require only plugging in a new node, as the inventive grid storage discovers and utilizes new nodes automatically. Storage manager need do nothing else: there is no LUN creation, no manual data migration, and no RAID group setup. Furthermore, the inventive grid storage system utilizes load balancing which automatically rebalances the system after nodes have been added/removed or in order to deal with hardware failures. This load balancing also allows non-disruptive hardware upgrades as well.

Self-Healing. The inventive grid storage system constantly monitors all components of the system 80 through its Auto-Manager 91F, quarantines failed components and initiates data recovery discussed below.

A web-based management interface 92 allows secure access from any location. Due to the inventive grid storage system's self-management functionality, the web-based interface serves primarily monitoring purposes.

The inventive grid storage system is distributed, resilient at the hardware level and self-managed. The inventive grid storage system is different from other architectures in that it relies on a large number of homogeneous nodes rather than a vast and complex collection of disk arrays and other special-purpose devices. On the architecture level, the inventive grid storage system overcomes the complexity issue by avoiding centralized management components and by limiting the hardware to one class of nodes that serve as simple building blocks of a scalable storage pool.

The inventive grid storage system's management 91 not only drives monitoring, self-management and self-healing at the node level, it performs much more on the data level. The management software handles all data services, including eliminating duplicate data to minimize the amount of storage required to store CDP-like granular data snapshots, and protecting data with a resiliency level determined by policies based on a given distributed resiliency technology. The management software 91 also verifies and maintains data integrity, and monitors component health and rebuilds data after failures.

These data services integrated into the management software allow the inventive grid storage system to not only perform the functions of a huge storage device, but also eliminates the need for point applications for backup, archiving or CDP altogether by storing data with high protection in the first place. This integration not only eliminates the task of managing and provisioning these point applications, but it also eliminates the need to read data over and over to create many copies for protection.

Figure 10:
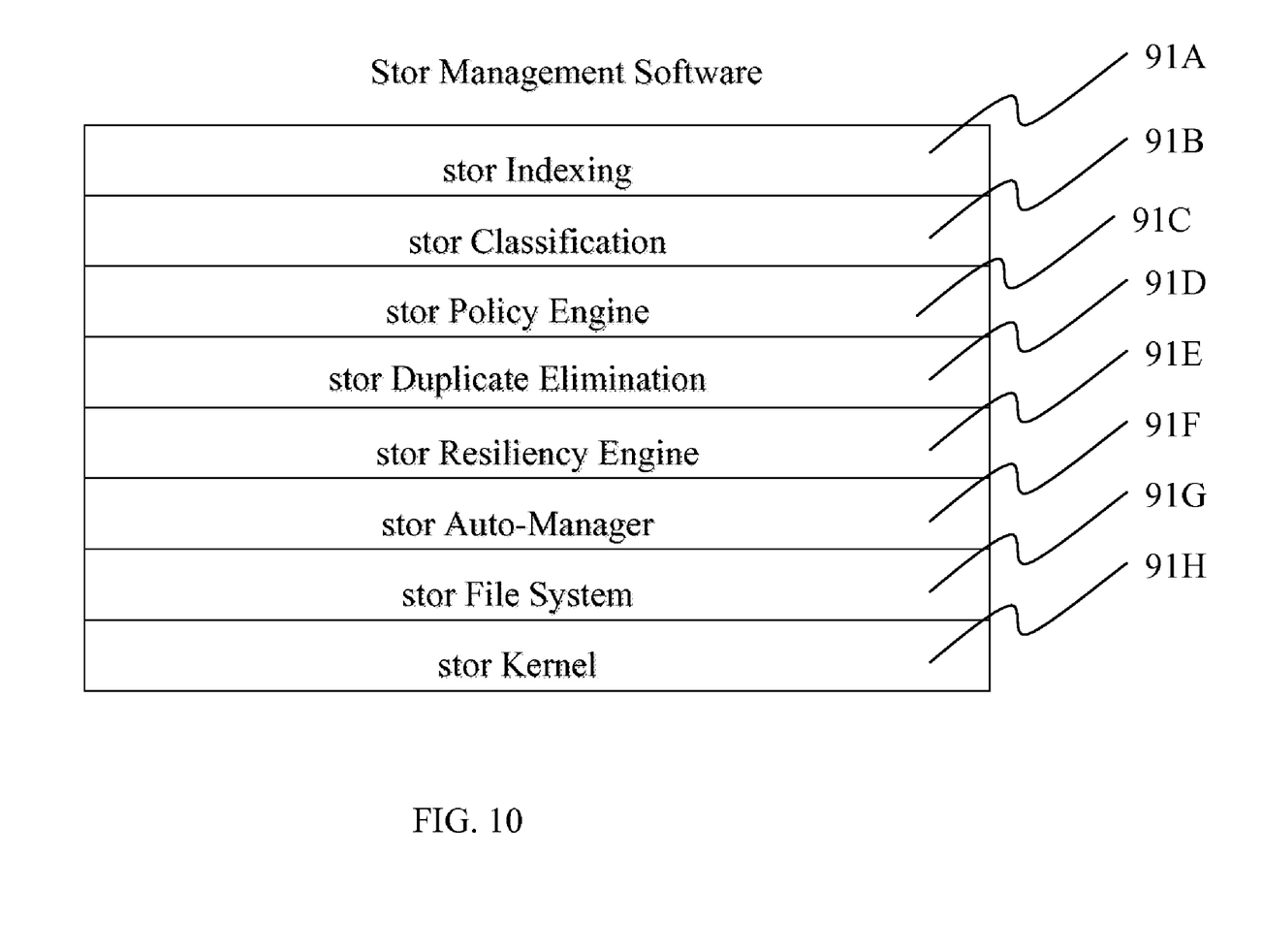
FIG. 10 is a schematic drawing of the storage management features of the grid storage system in accordance with the invention.

Key components of the inventive grid storage system's management software 91 shown in FIG. 10 include: 1) Distributed Search & Classification 91A, 91B, 2) Policy Engine 91C, 3) Duplicate Elimination technology and engine 91D, 4) Distributed Resiliency technology 91E, 5) Auto-Manager 91F, 6) File System (HFS) 91G and 7) Kernel 91H.

Distributed Search & Classification—Content and metadata of any piece of data written to the inventive grid storage system are indexed so they can be searched 91A and classified into collections 91B. This method of distributed search & classification allows customers to automatically apply HSM or ILM policies to their data.

Policy Engine—The policy engine 91C maintains the rules that govern the life cycle of each piece of data. Attributes can be assigned based on metadata such as author, source application, etc. or by automated classification based on content 91B. The inventive grid storage system has a policy-driven resilience schema that determines the level of protection based on the importance of the data as established by its data attributes. In its simplest form, the policy engine allows setting the level of protection required by the Distributed Resiliency technology 91E.

Duplicate Elimination technology and engine—With the inventive grid storage system, data are split into chunks on a sub-file level. A hash algorithm calculates a key that serves as an identifier of a specific chunk of data. If chunks are already in the system because a version of the same (or a similar) file has been stored previously, the chunk is discarded. Only new chunks get stored, thus ensuring that only one instance of each chunk takes up disk space. Thus, inventive grid storage system's duplicate elimination 91D is able to store granular snapshots, file versions, files from different applications e.g. file and email servers in a very efficient way minimizing storage capacity.

Distributed Resiliency technology—Where primary storage sufficiently protects data using RAID because multiple backups exist in case the RAID protection itself fails, RAID is not adequate if only one instance of each piece of data exists. The likelihood of data loss from multiple simultaneous failures or during rebuild is not negligible anymore. The issue worsens, as duplicate elimination on a sub-file level means that loss of one chunk could mean instant loss of many all versions of a file. The inventive grid storage system's distributed resiliency technology 91E solves this issue through several components: i) Resiliency Engine and ii) Load Balancing and Distribution Engine.

i) Resiliency Engine—Instead of loosing the advantages of duplicate elimination by replicating each piece of data multiple times or slowing write and rebuild performance using RAID5 or RAID6, the inventive grid storage system breaks each chunk into a set number of original fragments. For each of these fragments it calculates a number of parity fragments equal to the desired level of resiliency. As default, 9 original fragments are created plus 3 parity fragments. Any 9 of these 12 fragments are sufficient to recreate the whole chunk, which means that any 3 fragments can be lost due to failures in the system without data loss. Higher levels of resiliency can be chosen e.g. for critical data by modifying the number of parity fragments if the policy assigned by the policy engine [31C] requires it. Lost fragments are recreated automatically as part of the inventive grid storage system's self-healing process driven by the Auto-Manager 91F. As this requires only the fragments of the same chunk but not reading other data, it is much faster than e.g. recreating data using RAID parity blocks.

ii) Load Balancing and Distribution Engine—Once the fragments are created they are written to disk based on policies that spread fragments as much as possible across different locations, Storage Nodes and disks within a Storage Node. This ensures that most disk or even node failures result only in one fragment lost per chunk.

The same engine also handles load balancing based on the hardware capacity available and adjusting automatically to changes in the architecture.

Auto-Manager—As discussed above, the Auto-Manager 91F monitors all hardware components of the system. On the data level, the Auto-Manager automatically initiates data recovery after failures as well as data migration required to optimize storage utilization and performance.

File System (HFS)—The inventive grid storage system's File System 91G is designed to efficiently support reading and writing in multiple streams across all Accelerator Nodes 81B to the storage pool created by the Storage Nodes 81A.

Kernel—The inventive grid storage system includes a Kernel 91H that handles all processes below the file system level in both Accelerator Nodes 81B and Storage Nodes 81A.

To understand how all these components work together, let us look at a spreadsheet with the latest budget our CFO just created. As she shuts down her laptop for the evening, she does two things: she saves the file in her home directory (which actually is a folder on the inventive grid storage system), and then she emails it to 15 senior executives of the company. The mail server saves the email with that attachment in her sent folder as well as the 15 inboxes of her colleagues.

As the file is saved to her home directory, the file is indexed by the indexing engine 91A to enable keyword searches. The inventive grid storage system's policy engine 91C identifies it as critical data as she is a user on the senior management level, and the classification engine 91B has identified the file as 'Financial Data' which was set by IT to be protected at the highest levels of resiliency offered by inventive grid storage system. As customized by our IT department, the inventive grid storage system policy engine assigns protection against a minimum of up to nine failures plus adds in disaster recovery protection.

Our CFO's budget file is broken into chunks and the inventive grid storage system's Duplicate Elimination 91D checks for duplicates. As the file is newly created, no previous duplicates are found. The new chunks are passed on to the resiliency engine 91E which breaks them into nine data fragments and calculates nine resiliency fragments, since our IT department chose to protect this type of data against up to nine failures. Thus, any nine fragments are sufficient to recreate the chunk. To ensure fast reads, the Load Balancing and Distribution Engine 91D assigns the original nine fragments to nine different Storage Nodes in the local data center, while the remaining nine parity fragments are passed on to the remote DR site where they are stored on nine storage nodes (referred to herein below as supernodes) SNs also.

The mail server has committed 16 emails to the inventive grid storage system; the original sent email in our CFO's sent folder, and the fifteen copies she sent to the senior management team. These emails are also broken into chunks, just like the original budget spreadsheet files 91D. This time, however, the chunks originating from the spreadsheet are identified as duplicates of spreadsheet chunks from the original file. These duplicate chunks are discarded, and only data pointers to the chunks are stored. The same process happens as the fifteen executives save the email attachment in their own home directories. As no data (except for some meta data) actually needs to be stored, data writes are very fast.

Over the next two weeks, the budget spreadsheet is modified by several managers who each in turn distribute their revisions. Each new version is captured by an inventive grid storage system's snapshot through the File System 91G, allowing CDP-like roll-back to previous versions. In total, perhaps 10 different versions of the original file are stored with close to 200 total copies stored either as files or as email attachments, and all captured in a sequence of snapshots. The disk capacity required for the inventive grid storage system to keep these duplicate copies is equal to only twice the sum of original file size (original plus parity data) plus modifications plus some pointer metadata, which is more than an order of magnitude less than would be required to store 200 copies in several instances each from backups.

Two weeks later a fire destroys parts of the local data center including some of the SNs. Fortunately, no one is hurt, and all the IT department manages to escape the data center without harm. However, during this process, some of the nodes are damaged, and six fragments from the original budget file are lost. Amazingly, the data remains accessible any time as the entire file can be recovered using only the parity fragments from the remote location 91D. At the same time, the Auto-Manager 91F initiates recovery of lost data in the background on the remaining nodes both locally and in the remote site, and all the grateful storage administrator does is to connect the replacements for the destroyed SNs to the network. As he begins to monitor the healing progress through the unified Management Software GUI 92, the inventive grid storage system does the rest.

As the original file becomes two years old, the policy engine 91C lowers the level of protection 91E for the chunks that are not part of later file versions. Six of the nine high resiliency protection parity fragments are deleted to free up disk space, and yet our CFO's file is still protected against three simultaneous failures. As the file's age reaches seven years, any chunks that are not shared with later files are deleted to comply with legal requirements.

There are several innovative aspects of the inventive grid storage system in this scenario:

Data was written only once, instead of 100 times or more.

Data protection was assigned automatically based on user-customizable policy. There were no daily or weekly writes to disk or tapes to create backups. There was no separate replication application involved. There was no migration between storage tiers. There was no migration to an archiving repository either as the data matured.

There was also no manual interaction to create LUNs, provision vertical applications, move data, load balance or deal with the hardware failures from the fire other than replacing hardware. The inventive grid storage truly simplifies storage.

The inventive self managing and scalable grid storage system utilizes storage nodes configured as an improved peer to peer network of storage that extends the concept of Distributed Hash Tables (DHTs). The improved peer to peer method of storing data described herein allows for a simple DHT organization with built-in support for multiple classes of data redundancy which have a smaller storage overhead than previous DHTs. Embodiments of the invention also support automatic monitoring of data resilience and automatic reconstruction of lost and/or damaged data.

The peer to peer storage of data of the present grid storage provides greater robustness and resiliency to the DHT-based peer to peer network known as a Fixed Prefix Network (FPN) disclosed in U.S. patent application Ser. No. 10/813,504, filed Mar. 30, 2004 and incorporated herein by reference. Unlike traditional peer to peer networks, FPNs and networks according to the present invention, known as FPNs with Supernodes (FPN/SN), are constructed such that the contributed resources (e.g., nodes) are dedicated to the peer to peer system and the systems are accordingly significantly more stable and scalable.

Figure 1:
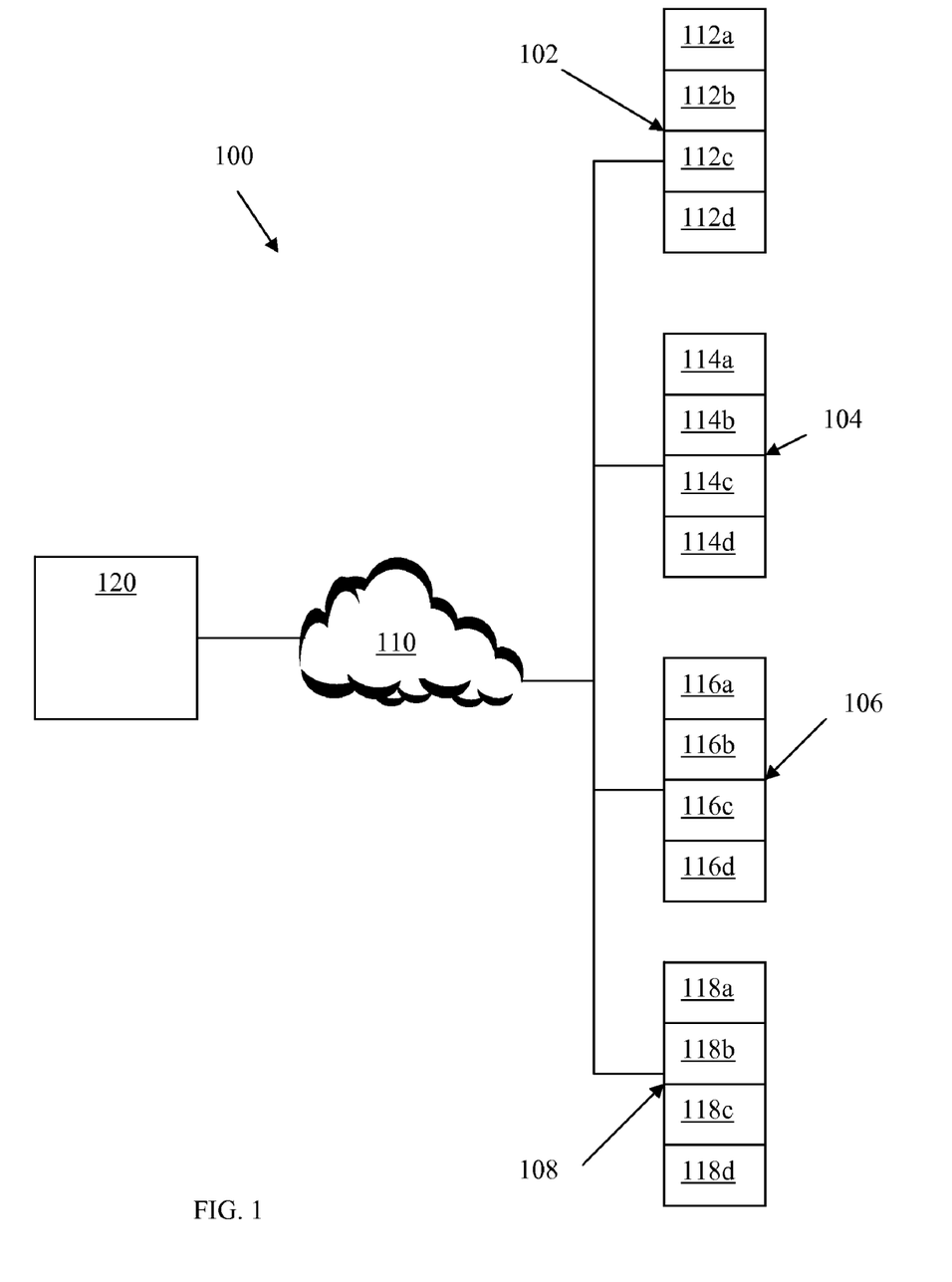
FIG. 1 is a diagram of an exemplary peer to peer network according to an embodiment of the invention.
Figure 2:
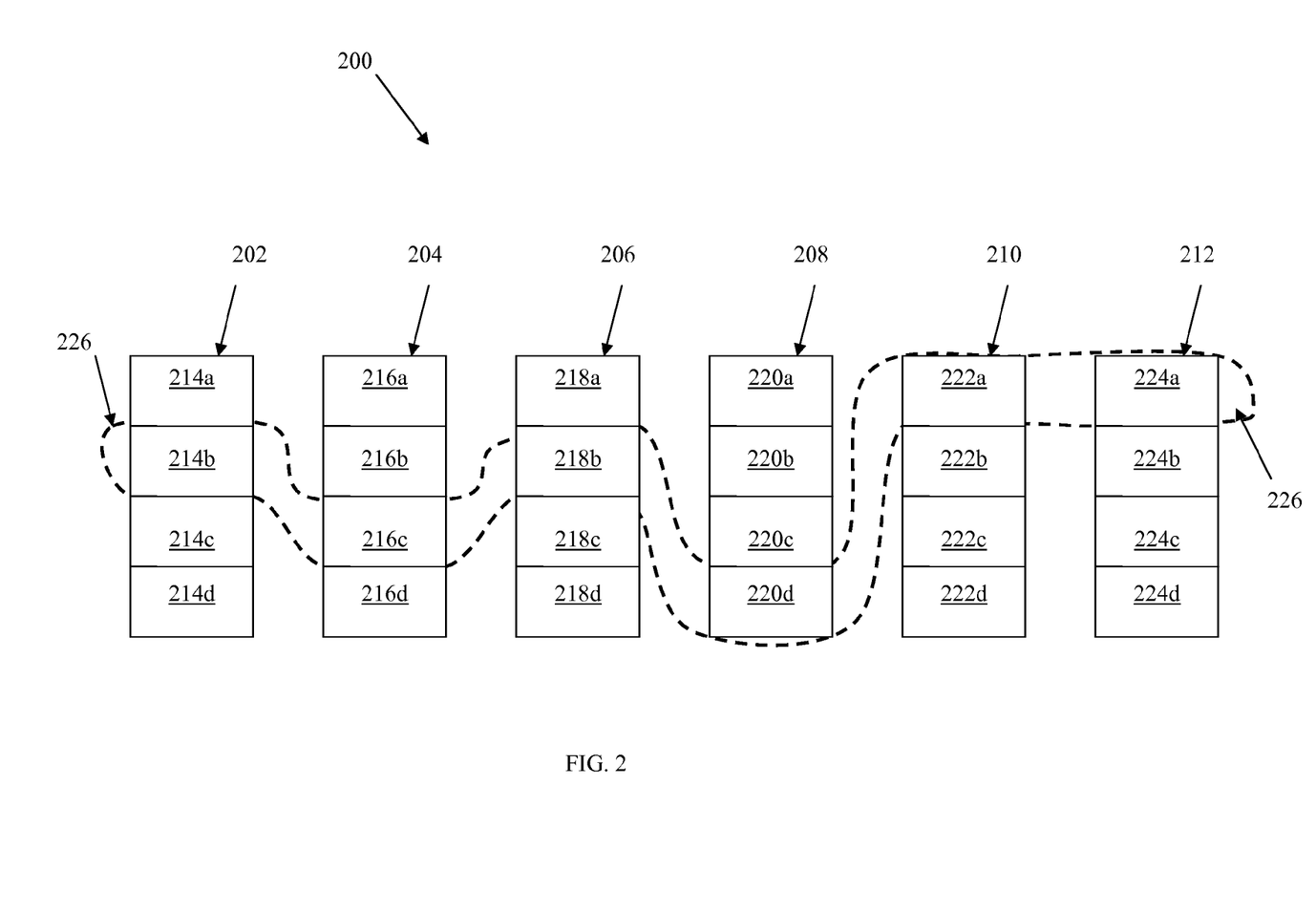
FIG. 2 is a diagram of an exemplary peer to peer network according to an embodiment of the invention.
Figure 3:
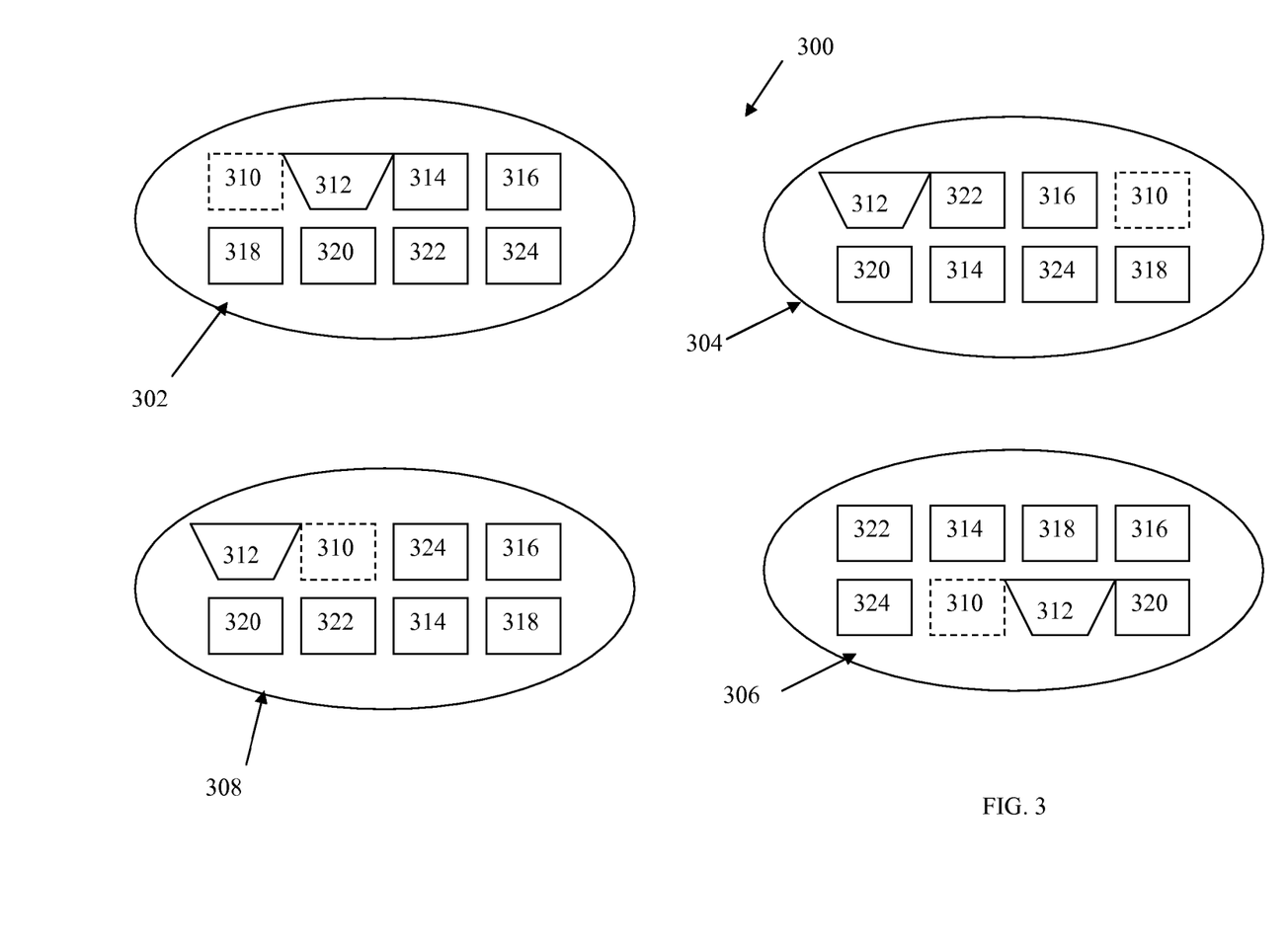
FIG. 3 is a diagram of an exemplary peer to peer network according to an embodiment of the invention.

FIGS. 1-3 depict various illustrative embodiments of peer to peer networks utilizing FPN/SNs. FIGS. 1-3 are exemplary diagrams to illustrate the various structures and relationships described below and are not meant to limit the invention to the specific network layouts shown.

FIG. 1 is a diagram of an exemplary peer to peer network 100 for use with an embodiment of the present invention. The peer to peer network 100 has a plurality of physical nodes 102, 104, 106, and 108 that communicate with each other through an underlying transport network 110 as is known. There is no restriction on the location, grouping, or number of the physical nodes 102-108 with regards to the present invention. Though depicted in FIG. 1 as four physical nodes 102-108, it is understood that any number of nodes in any arrangement may be utilized. Similarly, the physical nodes 102-108 may vary in actual storage space, processing power, and/or other resources.

Physical nodes 102-108 each have associated memories and/or storage areas (not shown) as is known. The memories and/or storage areas of physical nodes 102-108 are each logically divided into a plurality of slots approximately proportional to the amount of storage available to each physical node. That is, the memory and/or storage area of physical node 102 is logically divided into approximately equivalent-sized slots 112a, 112b, 112c, and 112d, the memory and/or storage area of physical node 104 is logically divided into approximately equivalent-sized slots 114a, 114b, 114c, and 114d, the memory and/or storage area of physical node 106 is logically divided into approximately equivalent-sized slots 116a, 116b, 116c, and 116d, and the memory and/or storage area of physical node 108 is logically divided into approximately equivalent-sized (e.g., in terms of storage capacity) slots 118a, 118b, 118c, and 118d. A physical node may be logically divided in that its memory and/or storage allocation may be allocated as different storage areas (e.g., slots). Physical nodes 102-108 may be divided into any appropriate number of slots, the slots being representative of an amount of storage space in the node. In other words, data may be stored in the nodes 102-108 in a sectorized or otherwise compartmentalized manner. Of course, any appropriate division of the storage and/or memory of physical nodes 102-108 may be used and slots 112a-d, 114a-d, 116a-d, and 118a-d may be of unequal size. Further, slot size may not be static and may grow or shrink and slots may be split and/or may be merged with other slots.

Each physical node 102-108 is responsible for the storage and retrieval of one or more objects (e.g., files, data, pieces of data, data fragments, etc.) in the slots 112a-d, 114a-d, 116a-d, and 118a-d, respectively. Each object may be associated with a preferably fixed-size hash key of a hash function. In operation, one or more clients 120 may communicate with one or more of physical nodes 102-108 and issue a request for a particular object using a hash key.

Slots 112a-d, 114a-d, 116a-d, and 118a-d may also each be associated with a component of a virtual (e.g., logical) node (discussed in further detail below with respect to FIGS. 2 and 3). Herein, components are not physical entities, but representations of a portion of a virtual node. That is, components may be logical representations of and/or directions to or addresses for a set or subset of data that is hosted in a particular location in a node (e.g., hosted in a slot). Storage locations of data fragments (e.g., data fragments discussed below with respect to FIG. 5) are logically organized into a virtual node.

FIG. 2 is a diagram of a portion of an exemplary peer to peer network 200 for use with an embodiment of the present invention. The peer to peer network 200 is similar to peer to peer network 100 and has a plurality of physical nodes 202, 204, 206, 208, 210, and 212 similar to physical nodes 102-108. Physical nodes 202-212 are each logically divided into a plurality of slots approximately proportional to the amount of storage available to each physical node. That is, physical node 202 is divided logically into slots 214a, 214b, 214c, and 214d, physical node 204 is divided logically into slots 216a, 216b, 216c, and 216d, physical node 206 is divided logically into slots 218a, 218b, 218c, and 218d, physical node 208 is divided logically into slots 220a, 220b, 220c, and 220d, physical node 210 is divided logically into slots 222a, 222b, 222c, and 222d, and physical node 212 is divided logically into slots 224a, 224b, 224c, and 224d. For simplicity of discussion and depiction in FIG. 2, since each slot 214a-d, 216a-d, 218a-d, 220a-d, 222a-d, and 224a-d hosts a component, the component corresponding to its host slot is referred to herein with the same reference numeral. For example, the component hosted in slot 214c of physical node 202 is referred to as component 214c.

A grouping of multiple components is referred to as a virtual node (e.g., a "supernode"). In the example of FIG. 2, supernode 226 comprises components 214b, 216c, 218b, 220d, 222a, and 224a. A virtual node (e.g., supernode) is thus a logical grouping of a plurality of storage locations on multiple physical nodes. The supernode may have any number of components—where the number of components is the supernode cardinality (e.g., the number of components in a supernode)—associated with any number of physical nodes in a network and a supernode need not have components from every physical node. However, each component of a supernode must be hosted in slots on different physical nodes. That is, no two components in a supernode should be hosted at the same physical node. The total number of components in a supernode may be given by a predetermined constant—supernode cardinality. In some embodiments, the supernode cardinality may be in the range of 4-32. The supernode cardinality may be a predetermined (e.g., desired, designed, etc.) number of data fragments.

In some embodiments, a larger supernode cardinality is chosen to increase flexibility in choosing data classes. In alternative embodiments, a smaller supernode cardinality is chosen to provide greater access to storage locations (e.g., disks) in read/write operations. Here, data classes define a level of redundancy where lower data classes (e.g., data class low) have less redundancy and higher data classes (e.g., data class high) have more redundancy. There may be a number of data classes equal to the predetermined supernode cardinality. The lowest data class is defined as having no redundant fragment and the highest class is defined as having (supernode cardinality−1) redundant fragments.

In an exemplary embodiment, data class low may refer to a single redundant fragment and data class high may refer to four redundant fragments. Of course, any appropriate number of data fragments may be set for data class low and/or data class high. In this exemplary embodiment, data blocks that are classified by user as data class low will be divided into a number of fragments equal to a supernode cardinality, where there are (supernode cardinality−1) original fragments and one redundant fragment. Accordingly, one fragment may be lost and the data block may be recreated. Using data class high (e.g., four redundant fragments) a block of data will be divided into fragments such that four of them will be redundant. Thus, four fragments may be lost and the original block of data may be recreated. Fragmentation, especially redundant fragments, is discussed in further detail below with respect to FIG. 5.

Components of the supernode may be considered peers and may similarly associated (e.g., in a hash table, etc.), addressed, and/or contacted as peer nodes in a traditional peer to peer network.

FIG. 3 depicts a high level abstraction of an exemplary peer to peer network 300 according to an embodiment of the invention. Peer to peer network 300 is similar to peer to peer networks 100 and 200 and has multiple physical nodes 302, 304, 306, and 308. Each of the physical nodes 302-308 is divided into multiple slots as described above. In the particular example of FIG. 3, each of the physical nodes 302-308 has eight slots. As in FIG. 2, each slot 310, 312, 314, 316, 318, 320, 322, or 324 hosts a component 310, 312, 314, 316, 318, 320, 322, or 324. Components 310-324 are each associated with a corresponding supernode and are distributed among the physical nodes 302-308. In this way, eight supernodes are formed, each with one component 310-324 on each of the four physical nodes 302-308. For example, a first supernode is formed with four components—component 310 hosted on physical node 302 (e.g., in a slot 310), component 310 hosted in physical node 304 (e.g., in a slot 310), component 310 hosted in physical node 306 (e.g., in a slot 310), and component 310 hosted in physical node 308 (e.g., in a slot 310). The first supernode, comprising components 310, is shown as dashed boxes. A second supernode comprises the four components 312 hosted in physical nodes 302-308 and is shown as a trapezoid. Of course, these are merely graphical representations to highlight the different components comprising different supernodes and are not meant to be literal representations of what a slot, component, node, or supernode might look like. The remaining six supernodes are formed similarly.

To facilitate data storage using the supernodes as described and shown in FIGS. 1-3, the fixed prefix network model of DHTs (e.g., FPN) may be extended to use supernodes. Any advantageous hashing function that maps data (e.g., objects, files, etc.) to a fixed-size hash key may be utilized in the context of the present invention. The hash keys may be understood to be fixed-size bit strings (e.g., 5 bits, 6 bits, etc.) in the space containing all possible combinations of such strings. A subspace of the hashkey space is associated with a group of bits of the larger bit string as is known. For example, a group of hash keys beginning with 110 in a 5 bit string would include all hash keys except those beginning with 000, 001, 010, 011, 100, and 101. That is, the prefix is 110. Such a subspace of the hashkey space may be a supernode and a further specification may be a component of the supernode. The prefix may be fixed for the life of a supernode and/or component. In such embodiments, the peer to peer network is referred to as a fixed-prefix peer to peer network. Other methods of hashing may be used as appropriate.

Figure 4:
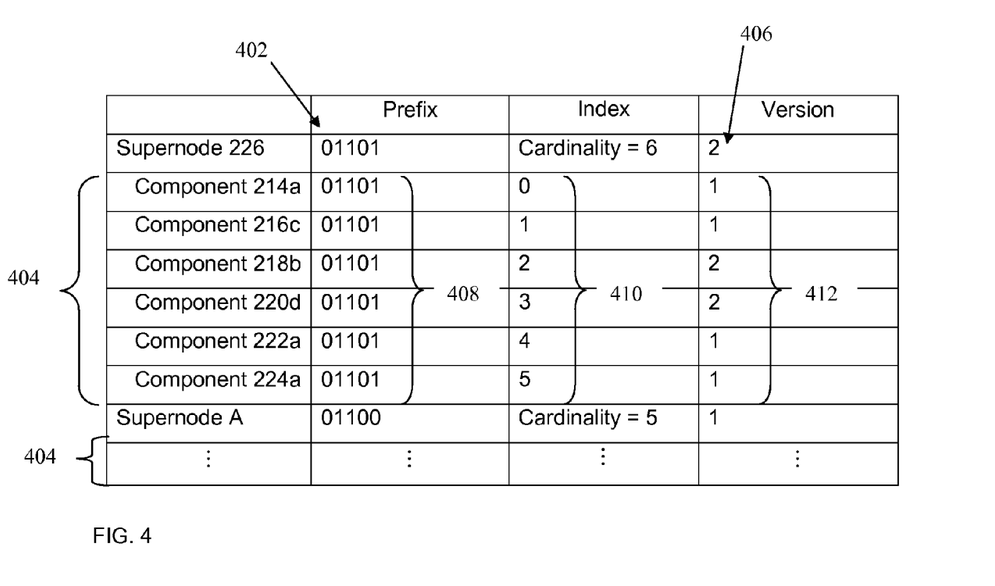
FIG. 4 is an exemplary supernode composition and component description table 400 according to an embodiment of the present invention.

FIG. 4 is an exemplary supernode composition and component description table 400 according to an embodiment of the present invention. The supernode composition and component description table 400 may be used in conjunction with the peer to peer network 200, for example. Each supernode (e.g., supernode 226) is described by a supernode composition (e.g., with supernode composition and component description table 400) comprising the supernode prefix 402, an array 404 of the component descriptions, and a supernode version 406. Since each component has a description as described below, the array 402 size is equal to the supernode cardinality. The supernode version 406 is a sequence number corresponding to the current incarnation of the supernode. Each supernode is identified by a fixed prefix 402 as described above and in U.S. patent application Ser. No. 10/813,504. For example, in hashing and/or storing data in peer to peer network 200 according to supernode composition and component description table 400 in which hash keys are fixed size bit strings, the supernode 226 has a fixed prefix of 01101. Therefore, any data that has a hash key beginning with 01101 will be associated with supernode 226.

In operation, each component (e.g., 214*b*, 216*c*, 218*b*, 220*d*, 222*a*, 224*a*, etc.) in the component array 404 is described by a component description comprising a fixed prefix 408, a component index 410, and a component version 412. All components of the supernode (e.g., in array 404) are also assigned the same fixed prefix for their lifetime. The component index 410 of each component corresponds to a location in the supernode array. A component's index is fixed for the component's lifetime and is an identification number pointing to the particular component. A component index is a number between 0 and (supernode cardinality−1). A component's version is a version number sequentially increased whenever the component changes hosts (e.g., nodes). In some embodiments, described in detail in related U.S. patent application Ser. No. 12/023,141, entitled "Methods for Operating a Fixed Prefix Peer to Peer Network", filed on Jan. 31, 2008, incorporated by reference herein, a component may be split or moved from one physical node to another and its version is increased in such instances.

Supernode composition and component description table 400 is an example of an organization of the information related to physical nodes, supernodes, and their respective components. Of course, one skilled in the art would recognize other methods of organizing and providing such information, such as storing the information locally on physical nodes in a database, storing the information at a remote location in a communal database, etc.

Updated indications of the supernode composition are maintained (e.g., in supernode composition and component description table 400, etc.) to facilitate communication amongst peers. Further, physical nodes associated with the components maintain compositions of neighboring physical and/or virtual nodes. To maintain such compositions, physical nodes associated with components ping peers and neighbors as is known. In this way, a physical node associated with a component may internally ping physical nodes associated with peers in the component's supernode to determine virtual node health and/or current composition. Further, a physical node associated with a component may externally ping physical nodes associated with neighbors (e.g., components with the same index, but belonging to a different supernode) to propagate and/or collect composition information. Of course, other systems and methods of organizing and/or keeping track of supernodes and their components, including version/incarnation information may be used as appropriate.

Figure 5:
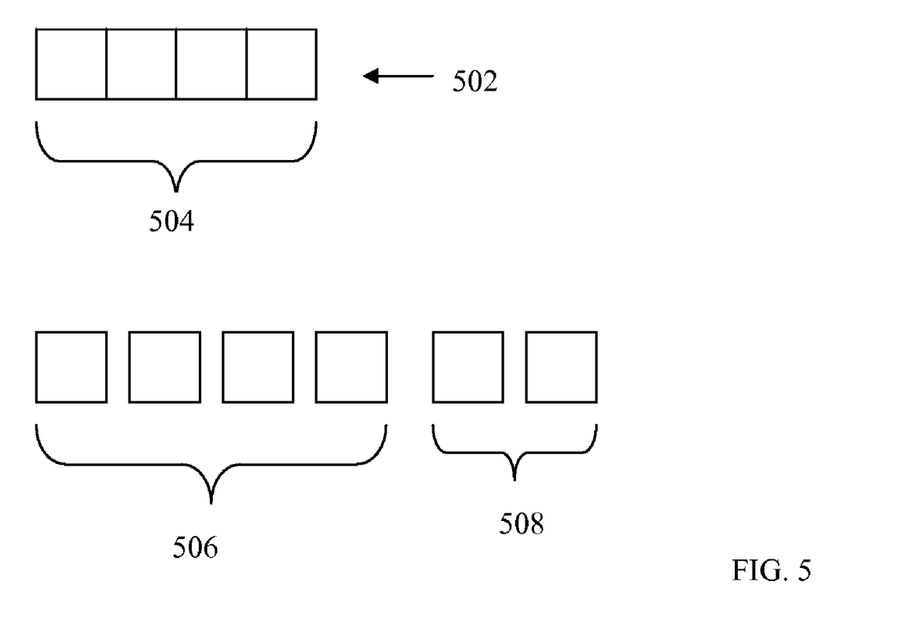
FIG. 5 is a depiction of data to be stored in a peer to peer network.

FIG. 5 is a generalized drawing of data that may be stored in peer to peer networks 100, 200, and/or 300. A block 502 of data may be divided into multiple pieces 504 of data according to any conventional manner. In at least one embodiment, the block of data 502 may be fragmented into multiple original pieces (e.g., fragments) 506 and a number of redundant fragments 508 may also be generated. Such fragmentation and/or fragment generation may be accomplished by erasure coding, replication, and/or other fragmentation means.

Figure 6:
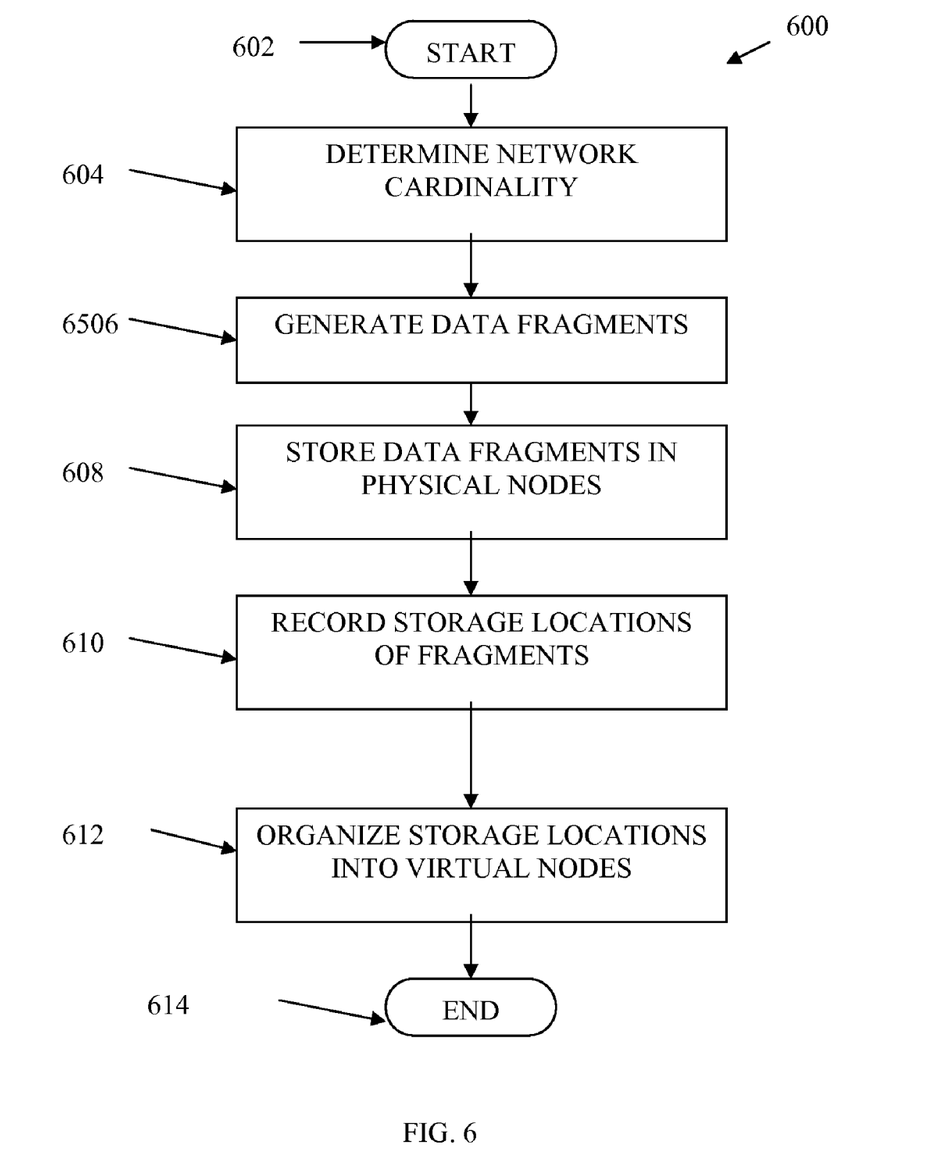
FIG. 6 is a flowchart of a method of storing data in a fixed prefix peer to peer network according to an embodiment of the present invention.

FIG. 6 depicts a flowchart of a method 600 of organizing data in a fixed prefix peer to peer network according to an embodiment of the present invention with particular reference to FIGS. 2 and 5 above. Though discussed with reference to the peer to peer network 200 of FIG. 2, the method steps described herein also may be used in peer to peer networks 100 and 300, as appropriate. The method begins at step 602.

In step 604, a network cardinality is determined. Network cardinality may be a predetermined constant for an entire system and may be determined in any appropriate fashion.

In step 606, a plurality of data fragments 506-508 are generated. In at least one embodiment, the data fragments 506-508 are generated from a block of data 502 by utilizing an erasure code. Using the erasure code transforms a block 502 of n (here, four) original pieces of data 504 into more than n fragments of data 506-508 (here, four original fragments and two redundant fragments) such that the original block 502 of n pieces (e.g., fragments) of data 504 can be recovered from a subset of those fragments (e.g., fragments 506-508). The fraction of the fragments 506-508 required to recover the original n pieces of data 504 is called the rate r. In some embodiments, optimal erasure codes may be used. An optimal erasure code produces n/r fragments of data where any n fragments may be used to recover the original n pieces of data. In alternative embodiments, near optimal erasure codes may be used to conserve system resources. In the same or alternative embodiments, the block of data 502 is divided into n pieces 506. Based on the original n pieces 506, m redundant fragments 508 are created where (m=supernode cardinality−n) and the fragment size is equal to the size of the original block of data 502 divided by n. It may be understood that the erasure coding and creation of redundant fragments 508 allows recreation of the original block of data 502 with half plus one redundant fragments 508 and/or original fragments 506. In the example shown in FIG. 5, only four total fragments from the group of fragments 506-508 are needed to reconstruct original block of data 502. Of course, any other erasure coding scheme may be used.

In step 608, the data fragments 506-508 are stored in different physical nodes 202-212. Each of the data fragments 506, representing the original pieces of the data block 502, and the redundant fragments 508 are stored in separate physical nodes 202-212 using any appropriate methods of storing data in a peer to peer network. In at least one embodiment, data fragments 506-508 are stored in separate slots 214a-d, 216a-d, 218a-d, 220a-d, 222a-d, 224a-d of the physical nodes 202-212. For example, one fragment from fragments 508 and 508 may be stored in each of slots 214b, 216c, 218b, 220d, 222a, and 224a.

A hash may be computed based on the original block of data 502. A virtual node (e.g., virtual node 226) is then found that has the same fixed prefix as the prefix of the computed hash. Since, virtual node 226 comprises components 214b, 216c, 218b, 220d, 222a, and 224a, the data fragments 506-508 are then stored in the slots 214b, 216c, 218b, 220d, 222a, and 224a corresponding to components 214b, 216c, 218b, 220d, 222a, and 224a.

In step 610, the storage locations of the data fragments 506-508 are recorded (e.g., mapped, etc.) in a data structure. The data structure may be a hash table, a DHT, a DHT according to the FPN referenced above, the data structures described in co-pending and concurrently filed U.S. patent application Ser. No. 12/023,141, entitled "Methods for Operating a Fixed Prefix Peer to Peer Network", incorporated by reference herein, or any other appropriate data structure. The data structure may facilitate organization, routing, look-ups, and other functions of peer to peer networks 100, 200, and 300. Fragments 506-508 may be numbered (e.g., from 0 to a supernode cardinality minus one) and fragments of the same number may be stored (e.g., grouped, arranged, etc.) in a logical entity (e.g., a virtual node component).

In step 612, the data structure facilitates organization of information about the data fragments 506-508 into virtual nodes (e.g., supernode 226, supernodes 310-324, etc.). That is, the storage locations (e.g., the slots in the physical nodes) storing each of the original fragments 506 and each of the redundant fragments 408 are organized into and/or recorded as a grouping (e.g., a virtual node/supernode as described above). Accordingly, the fragments 506-508 may be organized into and hosted in supernode 226 as described above so that location, index, and version information about the fragments of data 506-508 may be organized as components of supernode 226.

The method ends at step 614.

Figure 7:
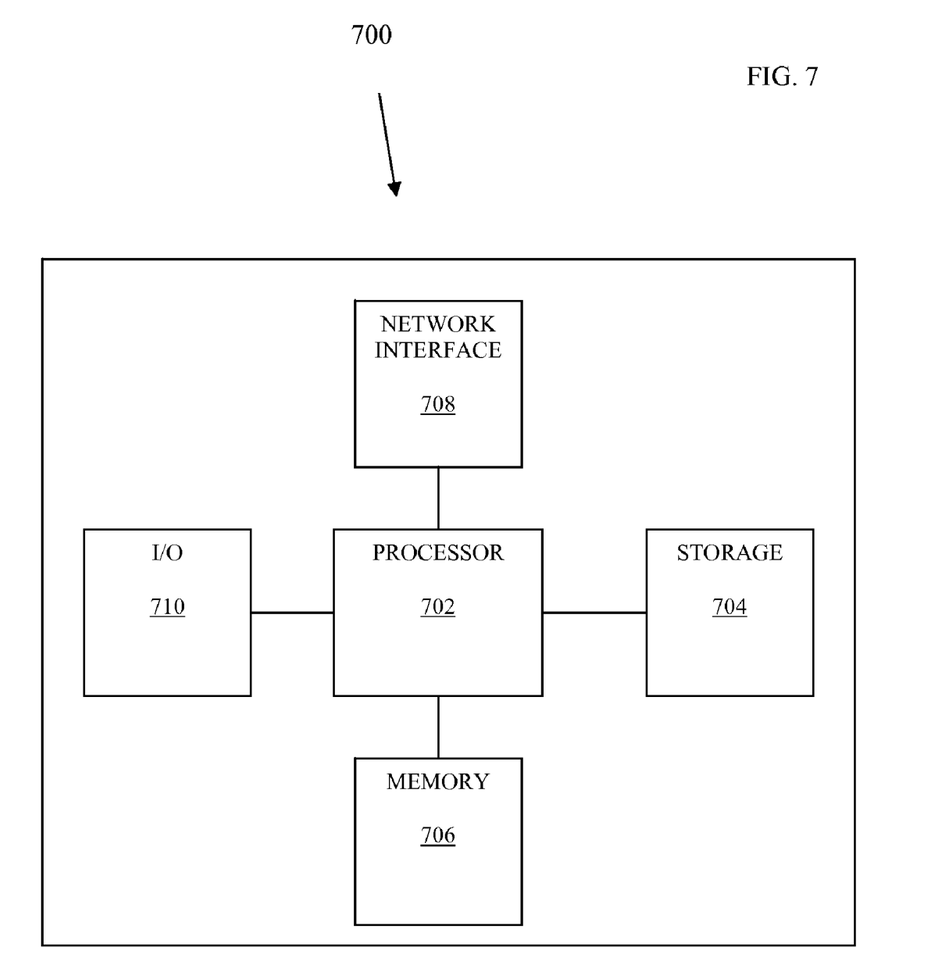
FIG. 7 is a schematic drawing of a controller according to an embodiment of the invention.

FIG. 7 is a schematic drawing of a controller 700 according to an embodiment of the invention. Controller 700 contains a processor 702 that controls the overall operation of the controller 700 by executing computer program instructions that define such operation. The computer program instructions may be stored in a storage device 704 (e.g., magnetic disk, database, etc.) and loaded into memory 706 when execution of the computer program instructions is desired. Thus, applications for performing the herein-described method steps, such as erasure coding, storing data, and DHT organization, in method 600 are defined by the computer program instructions stored in the memory 706 and/or storage 704 and controlled by the processor 702 executing the computer program instructions. The controller 700 may also include one or more network interfaces 608 for communicating with other devices via a network (e.g., a peer to peer network, etc.). The controller 700 also includes input/output devices 710 (e.g., display, keyboard, mouse, speakers, buttons, etc.) that enable user interaction with the controller 700. Controller 700 and/or processor 702 may include one or more central processing units, read only memory (ROM) devices and/or random access memory (RAM) devices. One skilled in the art will recognize that an implementation of an actual controller could contain other components as well, and that the controller of FIG. 7 is a high level representation of some of the components of such a controller for illustrative purposes.

According to some embodiments of the present invention, instructions of a program (e.g., controller software) may be read into memory 706, such as from a ROM device to a RAM device or from a LAN adapter to a RAM device. Execution of sequences of the instructions in the program may cause the controller 700 to perform one or more of the method steps described herein, such as those described above with respect to method 600 and/or erasure coding as described above with respect to FIG. 5. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 706 may store the software for the controller 700, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

The inventive methods of organizing a peer to peer network described herein improve network resiliency. Since each supernode includes the fragments derived from an original block of data (e.g., by erasure coding) and each of the fragments is thus stored on a separate physical node, the network is less susceptible to failure due to network changes. That is, changes to the peer physical nodes such as failures and node departures are less likely to affect the peer to peer network because of the distributed nature of the data.

Accordingly, the inventive methods may be employed on a peer to peer network. A controller (e.g., controller 700) may perform hashing functions store and/or look up one or more pieces of data in the peer to peer network. The controller may further be configured to recover the stored data should one or more of the physical nodes be lost (e.g., through failure, inability to communicate, etc.) Of course, the physical nodes in the peer to peer network may be configured to perform one or more of the functions of the controller instead.

As can be seen for the foregoing, the inventive grid storage system provides a scalable grid storage platform with one storage pool across an enterprise that can span multiple locations. The inventive grid storage is scalable, self-managed, and able to heal itself after failures of components, or even an entire data center. The inventive grid storage seamlessly rides the technology curve with non-disruptive upgrades and eliminates the need for point applications such as backup, archiving or CDP.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for grid storage comprising the steps of:
    balancing read and write requests from applications across a first group of nodes in a grid storage system for avoiding hot spots and optimizing performance through smart caching;
    balancing storage capacity across a second group of nodes in the grid storage system, nodes in the first and second groups being at least one of hardware interchangeable online, capable of being added to change performance or capacity of the grid storage system, and capable of being removed to change performance or capacity of the grid storage system; and
    self managing of the first and second groups of nodes for providing at least one of scalability, self healing after failure of components in the grid storage, non-disruptive upgrades to the grid storage system, and eliminating duplicate data on an object or sub-object level in the grid storage system;
    wherein the balancing steps with the first and second group of nodes comprises generating a plurality of data fragments by erasure coding a block of data and storing each of the plurality of data fragments in different physical nodes so they can be moved to maximize utilization of storage capacity; and
    wherein generating a plurality of data fragments by erasure coding a block of data comprises:
    determining a network cardinality;
    dividing the block of data into a number of original fragments; and
    creating a plurality of redundant fragments wherein the number of redundant fragments is equal to the network cardinality minus the number of original data fragments.

2. The method of claim 1, wherein the first and second groups of nodes and the self managing are configured without a central database or centralized lookup table for ensuring no single point of failure in the grid storage system while enabling scalability.

3. The method of claim 1, wherein storing each of the plurality of data fragments in different physical nodes comprises:
    logically dividing each of the physical nodes into a plurality of slots; and
    storing each of the plurality of data fragments in different slots on different physical nodes.

4. The method of claim 1, further comprising associating the different slots on different physical nodes as a virtual node.

5. The method of claim 1, further comprising mapping storage locations of the plurality of data fragments in a data structure wherein the storage locations are the physical nodes in which the plurality of data fragments are stored.

6. The method of claim 5, wherein the data structure is a distributed hash table.

7. The method of claim 1, wherein the self managing comprises content and metadata of any piece of data written to the grid storage system being indexed so the content and metadata can be searched and classified into classifications for allowing automatic application of user policies.

8. The method of claim 1, wherein the self managing comprises maintaining rules that govern the life cycle of each piece of data with attributes assignable based on metadata or by an automated classification based on content, the attributes establishing importance of the data for affecting level of protection of the data by the grid storage system.

9. The method of claim 1, wherein the self managing comprises data on the storage nodes being split into chunks on a sub-file level and a hash process calculating a key serving as an identifier for a specific chunk of data.

10. The method of claim 9, wherein if chunks are already in the grid system because a version of the same or similar file has been stored previously, the chunk is discarded, with new chunks getting stored for ensuring one instance of each chunk taking up storage space on the storage nodes.

11. The method of claim 1, wherein the self managing comprises data on the storage nodes being split into chunks on a sub-file level, breaking each chunk into a set number of original fragments, for each of the fragments calculating a number of parity fragments equal to a desired level of protection from data loss.

12. The method of claim 11, wherein level of protection from data loss can be modified by modifying number of parity fragments.

13. The method of claim 11, wherein once parity fragments are created they are written to storage in a way to spread the fragments across different storage nodes and disks within a storage node for ensuring that disk or storage node failures result in only one fragment lost per chunk.

* * * * *